US010858575B2

(12) United States Patent
Moloney et al.

(10) Patent No.: US 10,858,575 B2
(45) Date of Patent: Dec. 8, 2020

(54) TEMPERATURE-STABLE CORROSION INHIBITOR COMPOSITIONS AND METHODS OF USE

(71) Applicant: ChampionX USA Inc., Sugar Land, TX (US)

(72) Inventors: Jeremy Moloney, Katy, TX (US); Kousik Kundu, Houston, TX (US)

(73) Assignee: ChampionX USA Inc., Sugar Land, TX (US)

( * ) Notice: Subject to any disclaimer, the term of this patent is extended or adjusted under 35 U.S.C. 154(b) by 0 days.

(21) Appl. No.: 15/992,383

(22) Filed: May 30, 2018

(65) Prior Publication Data

US 2018/0346796 A1 Dec. 6, 2018

Related U.S. Application Data

(60) Provisional application No. 62/514,396, filed on Jun. 2, 2017.

(51) Int. Cl.
*C09K 8/54* (2006.01)
*E21B 41/02* (2006.01)
*C23F 11/16* (2006.01)
*C23F 11/10* (2006.01)

(52) U.S. Cl.
CPC ............... *C09K 8/54* (2013.01); *C23F 11/10* (2013.01); *C23F 11/161* (2013.01); *E21B 41/02* (2013.01); *C09K 2208/32* (2013.01)

(58) Field of Classification Search
None
See application file for complete search history.

(56) References Cited

U.S. PATENT DOCUMENTS

| | | | |
|---|---|---|---|
| 2,981,684 A | 4/1961 | Barnes et al. | |
| 3,329,658 A | 7/1967 | Fields | |
| 3,378,488 A * | 4/1968 | Nimerick | C09K 8/54 507/244 |
| 3,419,368 A | 12/1968 | Leas | |
| 3,770,055 A * | 11/1973 | Larsen | C09K 8/54 166/305.1 |
| 4,110,283 A | 8/1978 | Capelle | |
| 4,663,491 A | 5/1987 | Barthell et al. | |
| 4,670,516 A | 6/1987 | Sackmann et al. | |
| 4,900,331 A | 2/1990 | Le | |

(Continued)

FOREIGN PATENT DOCUMENTS

| | | |
|---|---|---|
| CN | 103614128 A | 3/2014 |
| RU | 2014347 C1 | 6/1994 |

(Continued)

OTHER PUBLICATIONS

European Search Report for EP Application No. 17736294.4, dated May 28, 2019, 7 pages.

(Continued)

*Primary Examiner* — John J Figueroa
(74) *Attorney, Agent, or Firm* — Kagan Binder, PLLC (57) ABSTRACT

Disclosed are compositions including one or more corrosion inhibitors, one or more solvents and one or more Log P additives. The compositions are useful as corrosion inhibitors for use in the petroleum industry wherein the compositions are stable, pumpable, and pourable at temperatures as low as −40° C. and as high as 60° C.

9 Claims, 1 Drawing Sheet

(56) References Cited

U.S. PATENT DOCUMENTS

| | | | |
|---|---|---|---|
| 4,906,682 A | 3/1990 | Mueller et al. | |
| 4,964,468 A * | 10/1990 | Adams | C09K 8/54 166/310 |
| 5,336,441 A | 8/1994 | Shah et al. | |
| 5,721,201 A | 2/1998 | Tomassen et al. | |
| 5,725,610 A | 5/1998 | Vassilakis et al. | |
| 5,756,004 A | 5/1998 | Brezinski | |
| 5,851,429 A | 12/1998 | Magyar | |
| 6,260,620 B1 | 7/2001 | Furman et al. | |
| 6,309,431 B1 | 10/2001 | Becker et al. | |
| 6,365,067 B1 * | 4/2002 | Ahn | C09K 8/54 252/389.23 |
| 6,488,868 B1 | 12/2002 | Meyer | |
| 6,783,582 B2 | 8/2004 | Goldman | |
| 7,057,050 B2 | 6/2006 | Meyer | |
| 7,332,459 B2 | 2/2008 | Collins et al. | |
| 7,338,541 B2 | 3/2008 | Connor et al. | |
| 7,449,429 B2 | 11/2008 | Goldman | |
| 9,080,120 B2 | 7/2015 | Adams et al. | |
| 9,090,849 B2 | 7/2015 | Adamczewska et al. | |
| 9,120,885 B2 | 9/2015 | Castro Sotelo et al. | |
| 9,493,716 B2 | 11/2016 | Burgazil et al. | |
| 2002/0166995 A1 | 11/2002 | Robinson et al. | |
| 2002/0193644 A1 | 12/2002 | Feustel et al. | |
| 2004/0110877 A1 | 6/2004 | Becker | |
| 2007/0213231 A1 | 9/2007 | Jennings | |
| 2007/0221539 A1 | 9/2007 | Cohrs et al. | |
| 2008/0078549 A1 | 4/2008 | Moorehead et al. | |
| 2010/0084612 A1 * | 4/2010 | Acosta | C23F 11/10 252/392 |
| 2010/0130385 A1 | 5/2010 | Guzmann et al. | |
| 2013/0156638 A1 * | 6/2013 | Hellberg | C08G 63/668 422/7 |
| 2014/0165457 A1 | 6/2014 | Castro et al. | |
| 2014/0273150 A1 | 9/2014 | Angel | |
| 2015/0011453 A1 * | 1/2015 | Bennett | C11D 11/0041 510/402 |
| 2015/0038470 A1 | 2/2015 | Keasler et al. | |
| 2017/0152201 A1 | 6/2017 | Becker et al. | |
| 2017/0190949 A1 | 7/2017 | Solomon et al. | |
| 2017/0190950 A1 | 7/2017 | Kundu et al. | |
| 2017/0292657 A1 | 10/2017 | Kundu | |
| 2017/0306502 A1 * | 10/2017 | Moloney | C23F 11/04 |

FOREIGN PATENT DOCUMENTS

| | | |
|---|---|---|
| WO | 0104238 A1 | 1/2001 |
| WO | 03/042428 A1 | 5/2003 |
| WO | 2005098200 A2 | 10/2005 |
| WO | 2012013432 A1 | 2/2012 |

OTHER PUBLICATIONS

European Search Report for EP Application No. 17736295.1, dated May 28, 2019, 7 pages.
Vertellus Specialties Inc., Citroflex Product Brochure, 16 pages, (2013).
Hallstar Technical Publication, "The Function and Selection of Ester Plasticizers," 26 pages.
Eastman Chemical Company, "Plasticizer formulation selector guide", Technical Tip, 4 pages, (2014).
Hallstar, Ester Plasticizers for Elastomers, Hallstar Elastomer Brochure, 26 pages (2013).
Hallstar, "Plasticizer/Polymer Polarity Chart," 4 pages.
George Wypych, "Plasticizers Use and Selection for Specific Polymers," Chapter 11, 107 pages, 2012.
Stephen O'Rourke, Hallstar Technical Publication, "High Performance Ester Plasticizers," (2001) 17 pages.
Wesley H. Whittington, Hallstar Technical Publication, "Ester Plassticizers for Polar Elastomers with Emphasis on Low-Temperature," 12 pages, (1983).
DOW P-Series Glycol Ethers, Product Information, (1992), 3 pages.
Lashkarbolooki et al, "Mitigation of Wax Deposition by Wax-Crystal Modifier for Kermanshash Crude Oil", Journal of Dispersion Science and Technology, vol. 32, No. 7, Jul. 2011, pp. 975-985.

* cited by examiner

TEMPERATURE-STABLE CORROSION INHIBITOR COMPOSITIONS AND METHODS OF USE

CROSS REFERENCE TO RELATED APPLICATIONS

This application claims the benefit of U.S. Provisional Patent Application Ser. No. 62/514,396, filed Jun. 2, 2017, the disclosure of which is incorporated in its entirety herein by reference.

FIELD OF THE INVENTION

The present disclosure generally relates to temperature stable corrosion inhibitor compositions.

BACKGROUND

Corrosion of metal surfaces continues to be a problem in the oil and gas industry. During the oil and gas production, corrosive agents such as brines, organic acids, carbon dioxide, hydrogen sulfide, solids such as sand, and/or microorganisms, are present in production and downstream systems. These aggressive constituents can cause severe corrosion as evidenced by surface pitting, embrittlement, and general loss of metal. Corrosion problems are even more troublesome in deep-sea operations where replacement of corroded equipment is difficult and costly. Therefore, corrosion inhibitors are commonly used during the production, transportation, storage, and separation of crude oil and natural gas.

Corrosion inhibitors (CI) are usually surface-active compounds that form protective films on the surface of the metal which comes in contact with corrosive environments thereby suppressing or reducing corrosion of the metal containments.

Formulations or compositions including corrosion inhibitors as non-aqueous or aqueous must be transported to and stored at the field locations where crude oil is recovered so that it can be applied as needed to the contents of the pipes, vessels, and the like.

Providing CI compositions in a fluid format—viz., in solution or dispersion—is advantageous for applying CIs in the field because pumping equipment suitable to meter the desired CI amount into a pipe or vessel is readily available. However, when the temperature drops below 0° C., CI compositions can form gels or solids or precipitate from the CI composition thereby resulting in use and dispensing problems. In some field locations it is not unusual for temperatures to be, for example, −10° C. or less, even −50° C. or less.

Previous solutions to the solidification problem of CI compositions included adding relatively large amounts (e.g., more than about 20 wt % or vol %) of low-flash point solvents, such as methanol, to the CI compositions. However, such large solvent amounts can pose other problems: While crude oil field operations encounter cold, winter like temperatures, the oil fields can encounter temperatures up to about 60° C.—often at the same oil field locations. At higher temperatures, systems containing large amounts of low-flash point and highly flammable solvents can have a significant health and safety implications, especially in off-shore production and processing facilities.

Others solutions to the solification problem included adding relatively large amounts (e.g., more than about 20 wt % or vol %) of solvents such as glycol. Whilst glycol has a higher flash point and more advantageous being of lower flammability and therefore safer to handle, at lower temperatures an increase in viscosity of glycol based products can impact the pumpability of CIs.

Stringent governmental regulations imposed on the oil and gas producing industry have demanded new "greener" chemistries with reduced environmental impact, yet requiring identical performance levels as with existing treatments.

In view of these challenges, improved, and in particular environmentally friendly, corrosion inhibitors are desirable. It would also be desirable to provide additives for CI compositions that reduce the formation of solids therein from −50° C. to 60° C., thereby allowing the pumping of the CI composition in the field within this temperature range and without buildup of highly flammable vapors at the upper end of the temperature range.

SUMMARY OF THE INVENTION

The disclosed CI blends show stability at low temperatures while maintaining adequate corrosion inhibition within a desired temperature range. Additionally, the solvents are such that they have a low tendency to bioaccumulate which helps to improve the environmental profile of the CI.

In one aspect of the invention is disclosed a corrosion inhibitor composition comprising one or more corrosion inhibitors, one or more solvents, and one or more Log P additives, wherein the composition is stable and flows at a temperature between about −50° C. to about 60° C.

In another aspect of the invention is disclosed a method of applying a corrosion inhibitor composition to a water source, the method comprising:

providing a corrosion inhibitor composition,
wherein the composition comprise: one or more corrosion inhibitors, one or more solvents, and one or more Log P additives, wherein the composition is stable and flows at a temperature between about −50° C. to about 60° C.

storing the corrosion inhibitor composition in an enclosed container at a first temperature between about −50° C. and 60° C.;

removing the corrosion inhibitor composition from the container at a second temperature between about −50° C. and 60° C.; and applying the corrosion inhibitor composition to a water source, wherein the removing and the applying are accomplished using a mechanical pump.

The Log P additives and the glycol ethers are also useful for enhancing solubility of the CI in the CI compositions.

In some aspects of the invention, the Log P additives and the glycol ethers are suitable for enhancing corrosion inhibition. In other aspects, the glycol ethers are suitable for reducing the rate of corrosion. In still other aspects, the Log P additives and the glycol ethers are suitable for providing CI compositions as stable and flow at a temperature between about −50° C. to about 60° C. as well as providing enhanced corrosion solubility and effective corrosion inhibition.

DETAILED DESCRIPTION

Although the present disclosure provides references to preferred embodiments, persons skilled in the art will recognize that changes may be made in form and detail without departing from the spirit and scope of the invention. Reference to various embodiments does not limit the scope of the claims attached hereto. Additionally, any examples set forth in this specification are not intended to be limiting and merely set forth some of the many possible embodiments for the appended claims. Preferred methods and materials are described below, although methods and materials similar or equivalent to those described herein can be used in practice or testing of the present invention. All publications, patent applications, patents and other references mentioned herein are incorporated by reference in their entirety. The materials, methods, and examples disclosed herein are illustrative only and not intended to be limiting.

Definitions

Unless otherwise defined, all technical and scientific terms used herein have the same meaning as commonly understood by one of ordinary skill in the art. In case of conflict, the present document, including definitions, will control.

As used herein, the term "corrosion inhibitor" (CI) means a compound or mixture that can retard, delay, minimize, reduce, inhibit, or prevent corrosion.

As used herein, the term "water source" means an injectate or a produced water.

As used herein, the term "injectate" means water plus any solids or liquids dispersed therein that is injected into a subterranean formation for the purpose of inducing hydrocarbon recovery therefrom. Injectates optionally include salts, polymers, surfactants, scale inhibitors, stabilizers, metal chelating agents, corrosion inhibitors, paraffin inhibitors, and other additives as determined by the operator in a subterranean hydrocarbon recovery process.

As used herein, the term "produced water" means water that flows back from a subterranean reservoir and is collected during a hydrocarbon recovery process including, but not limited to hydraulic fracturing and tertiary oil recovery. Produced water includes residual hydrocarbon products entrained therein and one or more of injectate, connate (native water present in the subterranean formation along with the hydrocarbon), brackish water, and sea water. Produced water ranges in temperature from about −30° C. to about 200° C., depending on the subterranean reservoir and the terranean environment and infrastructure proximal to the subterranean reservoir.

As used herein, the term "residual hydrocarbon products" means hydrocarbon liquids or solids entrained in produced water. As used in this context, the term "entrained" means dispersed, emulsified, or dissolved. Produced water having residual hydrocarbon products entrained therein includes between 0.001 wt % and 95 wt % residual hydrocarbon products, based on the total weight of the combined produced water and residual hydrocarbon products.

As used herein, the term "Log P additive" means a non-polymeric compound, component, or chemical species having 1 to 8 carbons, a Log P lower than about 1 (or a specific range therebelow), and a molecular weight of about 20 g/mol to about 200 g/mol.

As used herein, the term "Log P" also known as "partition coefficient" is the logarithm of the ratio of concentrations of a molecule in a mixture of two immiscible phases—water and octanol—at equilibrium. Thus Log P=log ([un-ionized solute in octanol]/[un-ionized solute in water]). While the singular "additive" is used, it should be noted that "Log P additive" refers not just to a single molecule but a plurality thereof forming a specific weight or volume of the compound, component, or chemical species as determined by context.

As used herein, the term "non-polymeric" refers to a compound characterized as having three or less covalently bonded repeating units and a molecular weight of less than 600 g/mol.

As used herein, the term "CIC" or "CI composition" means a mixture of one or more CIs, one or more solvents and one or more additives.

As used herein, the term "additive" means one or more substances or components that are present in smaller amounts (such as 0.2 wt % to 90 wt %) in the total CI composition to change or modify the properties of CI composition.

As used herein the term "solvent" means a substance that is present in larger amounts (such as 10% to 99 wt %) in the total CI composition, to dissolve the CI and additive in the CI composition.

As used herein, the term "non-aqueous" means substantially excluding water.

As used herein, the term "liquid", "flows", or "flow" means a CI composition that has a Brookfield viscosity at 10 $s^{-1}$ of about 5 cP to 1000 cP at −40° C., when measured at a shear rate of 10 $s^{-1}$ using a Brookfield viscometer equipped with a cup and bob, DIN spindle size 21 (viscometer equipment obtained from the Brookfield Engineering Laboratories of Middleboro, Mass.).

As used herein, the term "crude oil" or "crude oil source" or "crude oil product" means a hydrocarbon product of a subterranean reservoir, wherein the product is a liquid or a solid at 20° C. under a pressure of 1 atm, the product including at least linear and branched alkanes having the general formula $C_nH_{2n+2}$ wherein n is typically about 1-50, and can be greater than 50.

As used herein, the term "solidification point" means the temperature at which a composition no longer pours or flows. Likewise, "solidified" refers to a composition that does not pour or flow, and "solidification" refers to the process or state of being solidified.

As used herein, the term "stable" means a CI composition in which the contents of the composition do not precipitate out or visually appear cloudy or milky.

As used herein, the terms "comprise(s)," "include(s)," "having," "has," "can," "contain(s)," and variants thereof, are intended to be open-ended transitional phrases, terms, or words that do not preclude the possibility of additional acts or structures. The singular forms "a," "and" and "the" include plural references unless the context clearly dictates otherwise. The present disclosure also contemplates other embodiments "comprising," "consisting of," and "consisting essentially of," the embodiments or elements presented herein, whether explicitly set forth or not.

As used herein, the term "optional" or "optionally" means that the subsequently described event or circumstance may but need not occur, and that the description includes instances where the event or circumstance occurs and instances in which it does not.

As used herein, the term "about" modifying, for example, the quantity of an ingredient in a composition, concentration, volume, process temperature, process time, yield, flow rate, pressure, and like values, and ranges thereof, employed in describing the embodiments of the disclosure, refers to variation in the numerical quantity that can occur, for example, through typical measuring and handling procedures used for making compounds, compositions, concentrates or use formulations; through inadvertent error in these procedures; through differences in the manufacture, source, or purity of starting materials or ingredients used to carry out the methods, and like proximate considerations. The term "about" also encompasses amounts that differ due to aging of a formulation with a particular initial concentration or mixture, and amounts that differ due to mixing or processing a formulation with a particular initial concentration or mixture. Where modified by the term "about" the claims appended hereto include equivalents to these quantities. Further, where "about" is employed to describe a range of values, for example "about 1 to 5" the recitation means "1 to 5" and "about 1 to about 5" and "1 to about 5" and "about 1 to 5" unless specifically limited by context.

As used herein, the word "substantially" modifying, for example, the type or quantity of an ingredient in a composition, a property, a measurable quantity, a method, a position, a value, or a range, employed in describing the embodiments of the disclosure, refers to a variation that does not affect the overall recited composition, property, quantity, method, position, value, or range thereof in a manner that negates an intended composition, property, quantity, method, position, value, or range. Examples of intended properties include, solely by way of non-limiting examples thereof, flexibility, partition coefficient, rate, solubility, temperature, and the like; intended values include thickness, yield, weight, concentration, and the like. The effect on methods that are modified by "substantially" include the effects caused by variations in type or amount of materials used in a process, variability in machine settings, the effects of ambient conditions on a process, and the like wherein the manner or degree of the effect does not negate one or more intended properties or results; and like proximate considerations. Where modified by the term "substantially" the claims appended hereto include equivalents to these types and amounts of materials.

Discussion

CI compositions comprise, consist essentially of, or consist of one or more CIs, one or more solvents, and one or more additives. Conventional CI compositions often include a low-flash point co-solvent such as methanol (in a relatively high amount, more than 20 wt %) to help lower the freeze point or one or more surfactants, or both. However, such low-boiling point co-solvents can be volatile and typically do not store well at relatively higher temperatures (e.g., above 40° C.).

It has been discovered that Log P additives are useful at increasing the stability and reducing or eliminating solidification (e.g., decrease pour point) of CI compositions at low temperatures (e.g., about 0° C. to about −50° C. or below about −50° C.).

The CI compositions disclosed herein include surprisingly small amounts of Log P additives in a solution that includes one or more CIs. The relatively small amounts of Log P additives in the CI compositions can enable the CI composition to remain a liquid and stable in solution even at very low temperatures. This is a surprising result based on conventional knowledge which requires relatively large amounts of methanol solvents (e.g., greater than about 20 wt %) to lower the pour point.

It has also been discovered that some Log P additives and glycol ethers are useful at enhancing the solubility of the CIs in the CI composition, such that they provide effective or even better corrosion inhibition than CI compositions without the Log P additives or glycol ethers.

The CI compositions can allow for a single additive (e.g., single Log P additive) to achieve the stability for one or more CIs in a composition within a temperature range and at the same time achieve effective corrosion inhibition at lower CI amounts. In some embodiments, the ester compounds are characterized as having log P (that is, partition coefficient when octanol and water are tested) of about −3 to 1, for example about −2 to 0. Log P is the logarithm of the ratio of the concentrations of an un-ionized solute in two solvents; when one of the solvents is water and the other is a non-polar solvent, then the log P value is also known as a measure of lipophilicity. When the non-polar solvent is octanol, Log P is the partition coefficient.

Thus, disclosed herein are CI compositions and methods for inhibiting solidification in CI compositions at temperatures encountered during storage and/or transportation thereof, e.g. about −50° C. to 60° C. The stable CI compositions are stable, and flow, and thus are pourable or pumpable, at temperatures of −50° C. or below, or about 0° C. to −50° C., or about −5° C. to −50° C., or about −10° C. to −50° C., or about 0° C. to about −40° C., or about −10° C. to −40° C., or about −15° C. to −40° C., or about −20° C. to −40° C., or about −25° C. to −40° C., or about −30° C. to −40° C. and do not undergo observable precipitation or phase separation or turn cloudy at such temperatures. In some embodiments, the compositions further do not phase separate or solidify upon subsequent warming to 20° C., or as high as 60° C. In some embodiments, the CI compositions remain stable, in a single phase. In some embodiments, the CI compositions have a homogeneously dispersed or emulsified phase substantially over the temperature range of −40° C. to 60° C. even over long storage such as weeks or months.

Depending on the age of the well and the type of produced water (e.g. more oil based or more water-based), the CI composition can be formulated as an aqueous composition or non-aqueous composition.

In some embodiments, the CI compositions are non-aqueous. In other embodiments, the CI compositions include up to about 10 wt % water, or up to about 9% water, or up to about 8% water, or up to about 7% water, or up to about 6% water, or up to about 5% water, or up to about 4% water, or up to about 3% water.

In some embodiments, the CI compositions are characterized as having a substantially transparent, homogeneous appearance at least at one selected temperature between about 0° C. and 20° C., for example at 0° C., 1° C., 2° C., 3° C., 4° C., 5° C., 6° C., 7° C., 8° C., 9° C., 10° C., 11° C., 12° C., 13° C., 14° C., 15° C., 16° C., 17° C., 18° C., 19° C., or 20° C.

In some embodiments, the CI compositions are characterized as being substantially flowable at least at one selected temperature between about 0° C. and 20° C., for example at 0° C., 1° C., 2° C., 3° C., 4° C., 5° C., 6° C., 7° C., 8° C., 9° C., 10° C., 11° C., 12° C., 13° C., 14° C., 15° C., 16° C., 17° C., 18° C., 19° C., or 20° C.

In some embodiments, the CI compositions are characterized as having Brookfield viscosity of about 5 cP to 1000 cP at −40° C., when measured at a shear rate of 10 $s^{-1}$ using a Brookfield viscometer equipped with a cup and bob, DIN spindle size 21 (viscometer equipment obtained from the Brookfield Engineering Laboratories of Middleboro, Mass.). For example, in some embodiments, the CI compositions are characterized as having Brookfield viscosity at −40° C. and 10 $s^{-1}$ of about 5 cP to 900 cP, or about 5 cP to 800 cP, or about 5 cP to 700 cP, or about 5 cP to 600 cP, or about 5 cP to 500 cP, or about 5 cP to 400 cP, or about 5 cP to 300 cP, or about 5 cP to 200 cP, or about 5 cP to 100 cP, or about 10 cP to 1000 cP, or about 15 cP to 1000 cP, or about 20 cP to 1000 cP, or about 25 cP to 1000 cP, or about 30 cP to 1000 cP, or about 40 cP to 1000 cP, or about 50 cP to 1000 cP, or about 60 cP to 1000 cP, or about 70 cP to 1000 cP, or about 80 cP to 1000 cP, or about 90 cP to 1000 cP, or about 100 cP to 1000 cP, or about 10 cP to 500 cP, or about 20 cP to 500 cP, or about 10 cP to 250 cP, or about 20 cP to 250 cP, or about 10 cP to 200 cP, or about 20 cP to 200 cP, or about 10 cP to 100 cP, or about 20 cP to 100 cP.

In embodiments, the CI compositions comprise up to 30 wt % CI(s), since the solubility (and stability) of the CI(s) in the composition at temperatures below 20° C. is increased by the addition of some Log P additives. Thus, in embodiments, the CI composition comprises, consists essentially of, or consists of about 1 wt % to 30 wt % CI(s), or about 1 wt % to 25 wt %, or about 2 wt % to 20 wt %, or about 3 wt % to 15 wt %, or about 5 wt % to 10 wt %, or about 10 wt % to 30 wt %, or about 5 wt % to 25 wt %, or about 1 wt % to 15 wt %, or greater than about 0 wt % to about 5 wt %, or about 1 wt % to 5 wt %, or about 1 wt % to about 4 wt %, or about 2 wt % to about 3 wt %, or about 5 wt % to 20 wt %, or about 7 wt % to 20 wt %, or about 10 wt % to 20 wt %, or about 1 wt % to 10 wt %, or about 1 wt % to 7 wt %, or about 2 wt % to 6 wt %, or about 3 wt % to 8 wt %, or about 8 wt % to about 12 wt %, or about 8 wt % to about 10 wt %, or about 5 wt % to about 15 wt %, or about 10 wt % to about 15 wt %, or about 12 wt % to about 18 wt % CI.

In some embodiments, more than one CI may be present in a CIC, such as two or more CI, or three or more CI, or four or more CI. In such embodiments, each of the one or more CI may be present in the CIC in any of the wt % amounts disclosed above (e.g., two CI, both present in 1 wt % to 20 wt % of the total CI composition). In some embodiments, the total amount of the more than one CI (s) may be any of the above disclosed wt % amounts with each of the CI having a substantially even wt % split (e.g., two CI each present as half of 1 wt % to 20 wt % of a CI composition, or each of three CI present as one third of 1 wt % to 20 wt % of the CI in a CI composition).

CIs commonly employed (e.g., to apply to injectate, produced water or both injectate and produced water) contain one or more of an imide, amino, quaternary ammonium, pyridinyl, phosphate ester or organic sulfur functionality. Such compounds include, for example, mercaptoethanol, imidazoline, fatty acid adducts of imidazoline, alkyl, aralkyl, or aromatic ammonium functional compounds such as those formed from the reaction of aniline and related amino-functional aromatic compounds with $C_6$ to $C_{20}$ alkyl halides, and phosphate esters formed by the reaction of ethylene oxide with $H_3PO_4$.

In some embodiments quaternary nitrogen compounds (commonly referred to as quats) have been used extensively because of their ability to form a film on the surface of steel, stability over a wide range of pH and temperature, cost effectiveness, and efficiency in sour conditions (see, for example, U.S. Pat. Nos. 7,057,050; 6,488,868; 5,336,441; and 5,756,004 and WO 2003042428 A1).

Solvents provide the balance of CI compositions. The solvent may be present in the CI composition from about 10 wt % to about 99 wt % of the CI composition, such as about 10 wt % to about 90 wt %, or about 25 wt % to about 85 wt %, or about 30 wt % to about 80 wt %, or about 40 wt % to about 70 wt %, or about 60 wt % to about 90 wt %, or about 70 wt % to about 90 wt %, or about 65 wt % to about 85 wt %, or about 60 wt % to about 80 wt %, or about 50 wt % to about 80 wt %, or about 50 wt % to about 75 wt %, or about 50 wt % to about 67 wt %, or about 40 wt % to about 60 wt %, or about 30 wt % to about 50 wt %, or about 20 wt % to about 40 wt %, or about 20 wt % to about 30 wt %, or about 25 wt % to about 28 wt %, or about 15 wt % to about 35 wt %, or about 10 wt % to about 30 wt %, or about 10 wt % to about 55 wt %, or about 5 wt % to about 20 wt %, or more than about 50 wt %, or more than about 60 wt % of the CIC.

In non-aqueous formulations, the solvent can comprise, consist essentially of, or consist of refined petroleum distillates. Refined petroleum distillates comprise, consist essentially of, or consist of aromatic compounds such as benzene, toluene, xylene, light aromatic naphtha, heavy aromatic naphtha (HAN), or kerosene; and/or aliphatic compounds such as pentane, hexane, heptane, octane, nonane, decane, undecane, dodecane, tridecane, tetradecane, pentadecane, hexadecane, or any of their cyclic or branched isomers or a mixture thereof. Naphtha is a petrochemical industry term describing boiling point fractions of petroleum distillate collected at different points on a distillation column. Naphtha fractions may include linear or branched or cyclic alkanes or alkenes, aromatic hydrocarbons, or fused ring aromatic compounds or mixtures of these materials. Light naphtha is lower boiling material collected near the top portion of the distillation column; medium naphtha higher boiling material from near the middle. Heavy naphtha is an even higher boiling material from near the bottom portion of the column.

In some embodiments, the CI compositions comprise a solvent such as a refined petroleum distillate (e.g., naphtha, toluene, xylene, or HAN). The refined petroleum distillate may be present in the CIC in amounts disclosed herein.

In some embodiments, the CI compositions are non-aqueous compositions. In other words, they are characterized by the substantial absence of water. The non-aqueous CI compositions are liquids and stable mixtures at −50° C., such as between about −50° C. to 60° C., or about −40° C. to 0° C., or about −40° C. to −20° C., or about −40° C. to −10° C. In some embodiments, even when the CI compositions become hazy or translucent at lower temperatures, the CI remains therein in a substantially homogenous stable solution (e.g., substantially no precipitate or solid is observed).

In some embodiments, the CI compositions are aqueous compositions. In other words, they contain water in amounts ranging from 50 wt to about 99 wt % of the total CI composition.

Other suitable solvents can include alcohols such as primary alcohols (e.g., methanol, ethanol, propanol, the like, and combinations thereof), secondary alcohols (e.g., isopropanol, isobutanol, secondary butanol, the like, and combinations thereof), and tertiary alcohols (e.g., t-butanol, the like, and combinations thereof), glycols (e.g., ethylene glycol, ethylene glycol monobutyl ether, propylene glycol, 1,3-propanediol, the like, and combinations thereof), glycerol, aliphatic and aromatic hydrocarbons, the like, and combinations thereof. In some embodiments, CI and other additives may be sparingly or fully water-soluble and as such compositions may be suitably formulated in a mixture of water and one or more alcohols or glycols. Similarly, the described compounds may be suitably formulated in an aromatic naptha, such as heavy aromatic naptha, by incorporating one or more alcohols or glycols in the composition.

Representative alcohols include, for example, methanol, ethanol, isopropanol (IPA), propanol, butanol, isobutanol, tert-butanol, ethylene glycol, diethylene glycol, propylene glycol, 1,3-propanediol, butanediol, glycerine, the like, and combinations thereof.

The CI composition comprises, consists of one or more Log P additives. The Log P additive depresses the solidification point or pour point of the CI composition.

In some embodiments, suitable Log P additives are characterized as having a Log P (that is, a partition coefficient when octanol and water are used) of less than 1 such as about −2 to 0. Log P is the logarithm of the ratio of the concentrations of an un-ionized solute in two immiscible solvents; when one of the solvents is water and the other is a non-polar solvent (e.g., octanol), then the Log P value is also known as a measure of lipophilicity. When the non-polar solvent is octanol (that is, Log P=log([unionized solute in octanol]/[unionized solute in water]), Log P is the partition coefficient or partition constant.

Log P additives having melting points of less than about 20° C. and boiling points greater than 60° C. are especially useful as additives to CI compositions to reduce or eliminate the solidification of the CI temperatures between about 0° C. to −50° C., for example about −10° C. to −50° C., or about −20° C. to −40° C., or −30° C. to −40° C., or even below −50° C. while providing compositional stability at temperatures up to 60° C.

Suitable Log P additives may include small organic molecules (e.g., 8 or fewer total carbon atoms) having a Log P less than about 1 such as between about −2 and about 0. Such Log P additives may have a Log P similar to methanol, but may not be as volatile as methanol at higher temperatures. For example, the Log P additives herein may display boiling points exceeding 60° C., 100° C., or 200° C. Since the Log P additives have boiling points of greater than 60° C., and in many embodiments greater than 100° C., the Log P additives provide minimal contribution to hazardous conditions caused by buildup of pressure within a storage container or other sealed vessel when exposed to temperatures of 60° C. or higher. For example, the CI compositions disclosed herein can be safely manufactured, transported, stored, and used (e.g., poured) at temperatures encountered in oil fields from the Middle East to the Arctic (e.g., ranging from 60° C. to about −50° C.) and through seasonal temperature variations.

Suitable Log P additives comprise a non-polymeric molecule having 1 to 8 carbon atoms such as 6, 5, 4 or fewer carbon atoms, and a Log P between about −2 and about 1, such as between about −2 and about 0, or about −1.5 and about 0, or −1 and about 0, or about −0.5 and about 0, or about −0.75 and about −0.1, or about −0.6 and about −0.15, or about −0.5 and about −0.2, or about −0.3. In embodiments, the Log P additives have a molecular weight of 200 g/mol or less, such as about 150 g/mol or less, or 120 g/mol or less, or about 20 g/mol to about 200 g/mol, or about 30 g/mol to about 150 g/mol. Suitable Log P additives include low molecular weight alcohols and molecules having no hydroxyl moieties, as well as mixtures of the foregoing. In some embodiments, the Log P additives are characterized by the absence of hydroxyl moieties. Suitable Log P additives may include any of those listed below in Table 1.

TABLE 1

LogP additives and their corresponding LogP value in octanol/water.

| Compound | LogP |
| --- | --- |
| Methanol | −0.32 |
| Isopropanol | 0.42 |
| ethylene glycol (HO–CH2CH2–OH) | −0.95 |
| urea (H2N–C(=O)–NH2) | −1.00 |
| γ-butyrolactone | −0.57 |
| 2-ethylhexan-1-ol | 2.87 |
| 2-ethoxyethanol | −0.05 |
| 1,3-dioxolane | 0.13 |
| propylene carbonate | 0.37 |
| N,N-dimethylethanolamine | −0.29 |
| 2-piperidinone | 0.33 |
| morpholine | 0.41 |
| 3-morpholinone | −0.49 |
| tetramethylurea | −0.54 |
| Butanol | 1.12 |
| Isobutanol | 0.80 |
| propylene glycol | −0.59 |

TABLE 1-continued

LogP additives and their corresponding LogP value in octanol/water.

| Compound | LogP |
| --- | --- |
|  | −0.23 |
|  | −0.18 |
|  | 1.01 |
|  | −0.43 |
|  | 0.49 |
|  | 0.01 |
|  | 0.07 |
|  | 0.57 |
|  | −0.14 |
|  | −0.27 |
|  | −0.25 |
|  | 0.73 |

Exemplary Log P additives suitable for use as a (non-polymeric) CI composition that depress the freezing point include methanol, isopropanol, 1, 2-propanediol, 1, 4-dioxane, butyrolactone, 2-pyrrolidone, 2-methoxyethanol, dimethylethanolamine, 3-ketomorpholine, a formamide (such as N-ethylformamide), glycols, and mixtures including one or more of any of the foregoing. In some embodiments, the Log P additive(s) includes amine moieties (e.g., tertiary amines having one or more alcohol moieties) or ether moieties. Such non-hydroxyl moieties may be present on the Log P additive in addition to one or more hydroxyl moieties in the Log P additive. Examples of suitable Log P additive(s) that exclude hydroxyl moieties include butyrolactone, 2-pyrrolidone, 1, 4-dioxane, 2-methoxyethanol, dimethylethanolamine, 3-ketomorpholine, analogues of any of the foregoing, or mixtures of any of the foregoing. In some embodiments, the Log P additives are substantially free of hydroxyl moieties. Such hydroxyl free Log P additives include butyrolactone, 1, 4-dioxane, 2-pyrrolidone, 3-ketomorpholine, analogues of any of the foregoing, or mixtures of any of the foregoing.

In some embodiments, the Log P additive includes methanol, isopropyl alcohol, 2-methoxyethanol, ethylene glycol monobutyl ether, propylene carbonate, propyleneglycolmethyletheracetate, propyleneglycoldiacetate, combinations thereof and the like.

Solubility of the Log P additives in aqueous or oil-based systems can be predicted several ways, including HLB (hydrophilic-lipophilic balance) and OHLB (organic hydrophilic-lipophilic balance) values. HLB is most useful for predicting a solvent's solubility in water, and OHLB is most useful for predicting oil/water partitioning of solvents. The two scales run counter each other with respect to hydrophilicity. In some embodiments, the Log P additives suitable for use herein have HLB of about 5 to 10, such as about 6 to 9, or about 6 to 10, or about 7 to 10, or about 7 to 9. In some embodiments, the Log P additives suitable for use herein have an OHLB of about 10 to 21, such as about 11 to 21, or about 10 to 20, or about 10 to 19, or about 10 to 18, or about 10 to 17, or about 10 to 16, or about 11 to 16.

The HLB scale was derived initially for surfactants and provides a means of comparing the relative hydrophilicity of amphiphilic molecules. HLB values are also relevant for solvents with pseudo-surfactant qualities, such as glycol ethers. Complete water solubility occurs at HLB of about 7.3. Solvents with HLB values above this mark are completely miscible with water, while those below this value are only partially soluble in water. In some embodiments, the Log P additives are soluble in water to at least 0.1 wt % at 20° C. and up to completely miscible in water at 20° C. (that is, any ratio of a Log P additive or additive composition including the same and water form a solution). In some embodiments the Log P additives including the same are soluble in water at between about 1 wt % and 30 wt % at 20° C., for example about 5 wt % to 25 wt %, or about 5 wt % to 20 wt %, or about 10 wt % to 30 wt %, or about 15 wt % to 30 wt %, or about 20 wt % to 30 wt % soluble in water at 20° C.

The Log P additives useful in the CI composition are characterized as liquids at 20° C., and as having boiling points in excess of 60° C. at atmospheric pressure. The melting points of the Log P additives are generally 20° C. or less at atmospheric pressure, for example about 20° C. to −100° C., or about 15° C. to −80° C., or about −40° C. to about −100° C., or about −30° C. to −90° C. at atmospheric pressure. The boiling points of the Log P additives are greater than 60° C. at atmospheric pressure, for example about 60° C. to 300° C. at atmospheric pressure, or about 75° C. to 250° C., or about 100° C. to 250° C., or about 120° C. to 300° C., or about 150° C. to 300° C., or about 120° C. to 250° C. at atmospheric pressure.

The Log P additive(s) can be present in the CI composition in an amount of about 0.2 wt % to about 90 wt % of the CIC, or 0.2 wt % to about 80 wt %, or about 0.2 wt % to about 50 wt %, or about 0.2 wt % to about 30 wt %, or about 0.5 wt % to about 30%, or about 1 wt % to about 30 wt %, or about 1 wt % to 25 wt %, or about 1 wt % to 20 wt %, or about 1 wt % to 10 wt %, or about 1 wt % to 50 wt %, or about 5 wt % to 30 wt %, or about 5 wt % to 20 wt %, or about 10 wt % to 30 wt %. Particular CICs comprise about 1 wt % to about 20 wt % Log P additive(s), such as about 1 wt % to 10 wt %, or about 2 wt % to about 10 wt %, or about 3 wt % to about 8 wt %, or about 4 wt % to about 6 wt %, or about 4 wt % to about 10 wt %, or about 3 wt % to about 5 wt %, or about 6 wt % to about 8 wt %, or about 1 wt % to about 5 wt %, or about 1 wt % to about 3 wt %, or about 1 wt % to about 2 wt %, or about 2 wt % to about 4 wt %, or about 5 wt % to about 15 wt %, or about 10 wt % to about 20 wt %, or about 10 wt % to about 15 wt %, or about 5 wt % to about 15 wt %, or about 8 wt % to about 12 wt %, or about 10 wt % to about 20 wt %, or about 15 wt % to about 20 wt %, or about 13 wt % to about 17 wt %, or about 20 wt % or less, or about 15 wt % or less, or about 10 wt % or less, or about 8 wt % or less, or about 5 wt % or less.

It has been discovered that specific amounts and types of polar, non-polymeric ether (e.g., glycol ether) compounds having 15 or less total carbon atoms therein are useful as Log P additives in CI compositions to increase stability and reduce or eliminate the solidification of CIs at low temperatures (e.g., about 0° C. to about −50° C. or at about −50° C.). Glycol ether compounds having melting points of less than about 20° C., boiling points greater than 100° C., and low vapor pressure at 60° C. are especially useful as additives to CI compositions to reduce or eliminate the solidification of the CI compositions at temperatures between about 0° C. to −50° C., for example about −10° C. to −40° C., or about −20° C. to −40° C., or −30° C. to −40° C., or even below −40° C. while providing compositional stability at temperatures up to 60° C.

In some embodiments the glycol ether compound may have 12 or less total carbon atoms therein, such as 10 or less, 9 or less, or 6 or less total carbon atoms therein. Exemplary glycol ether compounds include the formula HO(CH2CH(R2)O)nR1, where n=1-3; R1=C1-C6 alkyl group or phenyl group; and R2=H or a methyl group. Exemplary classes of glycol ether compounds include ethylene and propylene glycol ethers. For example, exemplary glycol ether compounds may include an ethylene glycol monoalkyl ether, ethylene glycol dialkyl ether, propylene glycol monoalkyl ether, propylene glycol dialkyl ether, or mixtures including of any of the forgoing.

Exemplary (non-polymeric) glycol ethers include ethylene glycol methyl ether, ethylene glycol ethyl ether, ethylene glycol propyl ether, ethylene glycol butyl ether, ethylene glycol pentyl ether, ethylene glycol hexyl ether, diethylene glycol methyl ether, diethylene glycol ethyl ether, diethylene glycol propyl ether, diethylene glycol butyl ether, diethylene glycol pentyl ether, diethylene glycol hexyl ether, triethylene glycol methyl ether, triethylene glycol ethyl ether, triethylene glycol propyl ether, triethylene glycol butyl ether, triethylene glycol pentyl ether, triethylene glycol hexyl ether, propylene glycol methyl ether, propylene glycol ethyl ether, propylene glycol propyl ether, propylene glycol butyl ether, propylene glycol pentyl ether, propylene glycol hexyl ether, dipropylene glycol methyl ether, dipropylene glycol ethyl ether, dipropylene glycol propyl ether, dipropylene glycol butyl ether, dipropylene glycol pentyl ether, dipropylene glycol hexyl ether, tripropylene glycol methyl ether, tripropylene glycol ethyl ether, tripropylene glycol propyl ether, tripropylene glycol butyl ether, tripropylene glycol pentyl ether, tripropylene glycol hexyl ether, ethylene glycol phenyl ether, diethylene glycol phenyl ether, triethylene glycol phenyl ether, propylene glycol phenyl ether, dipropylene glycol phenyl ether, tripropylene glycol phenyl ether, and mixtures including one or more of any of the foregoing.

The glycol ether compounds useful in the CI compositions are characterized as liquids at 20° C., and as having boiling points in excess of 100° C. at atmospheric pressure. The melting points of the ether compounds are generally 20° C. or less at atmospheric pressure, for example about 20° C. to −100° C., or about 15° C. to −80° C., or about −40° C. to about −100° C., or about −30° C. to −90° C. at atmospheric pressure. The boiling points of the ether compounds are greater than 100° C. at atmospheric pressure, for example about 100° C. to 300° C. at atmospheric pressure, or about 100° C. to 280° C., or about 100° C. to 250° C., or about 120° C. to 300° C., or about 150° C. to 300° C., or about 120° C. to 250° C. at atmospheric pressure. The ether compounds are further characterized as having low vapor pressure at temperatures of about 20° C. or less, such as less than about 10 mm Hg or less, about 6 mm Hg or less.

In some embodiments, particularly effective Log P additives comprise, consist essentially of, or consist of, ethylene glycol methyl ether (e.g., ethylene glycol monomethyl ether), ethylene glycol ethyl ether, ethylene glycol butyl ether (e.g., ethylene glycol monobutyl ether), diethylene glycol methyl ether, diethylene glycol ethyl ether, diethylene glycol butyl ether, ethylene glycol hexyl ether, diethylene glycol hexyl ether, propylene glycol methyl ether, propylene glycol propyl ether, propylene glycol butyl ether, dipropylene glycol methyl ether, dipropylene glycol propyl ether, dipropylene glycol butyl ether, tripropylene glycol methyl ether, tripropylene glycol butyl ether, or a combination of two or more thereof.

In some embodiments, particularly effective Log P additives comprise, consist essentially of, or consist of, glycol ethers. Exemplary glycol ethers include ethylene glycol monobutyl ether, propylene carbonate, propyleneglycolmethyletheracetate, propyleneglycoldiacetate, combinations thereof and the like The foregoing ether compounds have the following properties, wherein all properties are measured at ambient pressure unless otherwise specified. All are liquids at 20° C.

ethylene glycol methyl ether, bp=124° C.; mp=−85° C.; vapor pressure=6.17 mm Hg at 20° C.

ethylene glycol ethyl ether, bp=135° C.; mp=−90° C.; vapor pressure=3.8 mm Hg at 20° C.

ethylene glycol butyl ether, bp≈170.7° C.; mp=−75° C.; vapor pressure=10 mm Hg at 20° C.

ethylene glycol hexyl ether, bp=208° C.; mp=−45° C.; vapor pressure=0.05 mm Hg at 20° C.

diethylene glycol methyl ether, bp=194° C.; mp=−70° C.; vapor pressure=0.2 mm Hg at 20° C.

diethylene glycol ethyl ether, bp=202° C.; mp=−76° C.; vapor pressure=0.12 mm Hg at 20° C.

diethylene glycol butyl ether, bp=231° C.; mp=−68° C.; vapor pressure=30 mm Hg at 20° C.

diethylene glycol hexyl ether, bp=260° C.; mp=−40° C.; vapor pressure=0.001 mm Hg at 20° C.

propylene glycol methyl ether, bp=120° C.; mp=−97° C.; vapor pressure=8.7 mm Hg at 20° C.

propylene glycol propyl ether, bp≈150° C.; mp=−80° C.; vapor pressure=4.5 mm Hg at 20° C.

propylene glycol butyl ether, bp=171° C.; mp<−75° C.; vapor pressure=0.85 mm Hg at 20° C.

dipropylene glycol methyl ether, bp=190° C.; mp=−80° C.; vapor pressure=0.28 mm Hg at 20° C.

dipropylene glycol propyl ether, bp=213° C.; mp=−75° C.; vapor pressure=0.08 mm Hg at 20° C.

dipropylene glycol butyl ether, bp=230° C.; mp<−75° C.; vapor pressure=0.04 mm Hg at 20° C.

tripropylene glycol methyl ether, bp=243° C.; mp=−78° C.; vapor pressure=0.01 mm Hg at 20° C.

tripropylene glycol butyl ether, bp=274° C.; mp=−75° C.; vapor pressure=0.002 mm Hg at 20° C.

The glycol ether compound(s) may be present in the CI composition in an amount of about 0.2 wt % to about 90 wt % of the CIC, or 0.2 wt % to about 80 wt %, or about 0.2 wt % to about 50 wt %, or about 0.2 wt % to about 30 wt %, or about 0.5 wt % to about 30%, or about 1 wt % to about 30 wt %, or about 1 wt % to 25 wt %, or about 1 wt % to 20 wt %, or about 1 wt % to 10 wt %, or about 1 wt % to 50 wt %, or about 5 wt % to 30 wt %, or about 5 wt % to 20 wt %, or about 10 wt % to 30 wt %. Particular CICs comprise about 1 wt % to about 20 wt % glycol ether(s), such as about 1 wt % to 10 wt %, or about 2 wt % to about 10 wt %, or about 3 wt % to about 8 wt %, or about 4 wt % to about 6 wt %, or about 4 wt % to about 10 wt %, or about 3 wt % to about 5 wt %, or about 6 wt % to about 8 wt %, or about 1 wt % to about 5 wt %, or about 1 wt % to about 3 wt %, or about 1 wt % to about 2 wt %, or about 2 wt % to about 4 wt %, or about 5 wt % to about 15 wt %, or about 10 wt % to about 20 wt %, or about 10 wt % to about 15 wt %, or about 5 wt % to about 15 wt %, or about 8 wt % to about 12 wt %, or about 10 wt % to about 20 wt %, or about 15 wt % to about 20 wt %, or about 13 wt % to about 17 wt %, or about 20 wt % or less, or about 15 wt % or less, or about 10 wt % or less, or about 8 wt % or less, or about 5 wt % or less.

The CI compositions disclosed herein may include one or more CI, one or more low solvents (e.g., polarity refined petroleum), and one or more Log P additives. The CI compositions disclosed herein may optionally include one or more surfactants, one or more preservatives, one or more stabilizers (e.g., quenchers), one or more biocides, or combinations of any of the foregoing in any of the respective amounts disclosed herein.

In some embodiments, a CI composition comprises one or more surfactants. In an embodiment, the one or more surfactants are nonionic and/or amphoteric surfactants and/or anionic surfactants. The CI compositions in such embodiments comprises about 0 wt % to 10 wt % of each species of a nonionic, amphoteric, or anionic surfactant, or about 0.5 wt % to 10 wt %, or about 1 wt % to 10 wt %, or about 2 wt % to 10 wt %, or about 3 wt % to 10 wt %, or about 4 wt % to 10 wt %, or about 5 wt % to 10 wt %, or about 4 wt % to about 7 wt %, or about 5 wt % to about 6 wt %, or about 2.5 wt % to about 4 wt %, or about 3 wt % to about 3.5, wt %, or about 0.5 wt % to 9 wt %, or about 0.5 wt % to 8 wt %, or about 0.5 wt % to 7 wt %, or about 0.5 wt % to 6 wt %, or about 0.5 wt % to 5 wt %, or about 0.5 wt % to 4 wt %, or about 0.5 wt % to 3 wt %, or about 0.5 wt % to 2 wt %, or about 0.5 wt % to 1 wt %, or about 1 wt % to 8 wt %, or about 1 wt % to 5 wt %, or about 1 wt % to about 2 wt %, or about 1.5 wt % nonionic, amphoteric, or anionic surfactant. The CIC in such embodiments comprises about 0 wt % to about 40 wt % total nonionic, amphoteric, and/or anionic surfactant(s), or about 0.5 wt % to 30 wt %, or about 1 wt % to 25 wt %, or about 5 wt % to 30 wt %, or about 5 wt % to 25 wt %, or about 10 wt % to 25 wt %, or about 10 wt % to 20 wt %, or about 15 wt % to about 30 wt %, or about 18 wt % to about 22 wt %, or about 20 wt % nonionic, amphoteric, and/or anionic surfactant(s).

Nonionic surfactants useful in the CI compositions include but are not limited to alkoxylated alcohols, such as copolymers of ethylene oxide and/or propylene oxide and/or butylene oxide and epoxylated, propoxylated, and epoxylated-propoxylated compounds comprising derivatives of $C_6$-$C_{40}$ alkanols or derivatives of $C_8$-$C_{30}$ alkanols. Suitable alkanols include linear, branched, aromatic, or alkaromatic alkanols. In some embodiments, the alkoxylated alcohols comprise about 3 to 100 alkoxylate repeat units, or about 3 to 90, or about 3 to 80, or about 3 to 70, or about 3 to 60, or about 3 to 50, or about 3 to 40, or about 3 to 30 alkoxylate repeat units. In some embodiments the alkoxylate repeat units are selected from ethoxylate, propoxylate, or a combination thereof in random or block configuration. In many embodiments, a blend of two or more alkoxylated alcohol surfactants is employed in the CIC. In some embodiments, suitable non-ionic surfactants may include the $C_8$-$C_{24}$ or $C_{14}$-$C_{24}$ reaction product of a fatty acid conjugated with an ethanolamine, such as cocodiethanolamide. Other nonionic surfactants are similarly useful in the CIC of the invention and are not particularly limited. Some examples of suitable nonionic surfactants include alkylphenol alkoxylates (e.g., nonylphenol ethoxylate), block copolymers of ethylene, propylene and butylene oxides, alkyl polyglucosides, polyalkoxylated glycerides, sorbitan esters and polyalkoxylated sorbitan esters, and alkoyl polyethylene glycol esters and diesters.

Some examples of suitable amphoteric surfactants include alkyl dimethyl amine oxides, alkyl-bis(2-hydroxyethyl) amine oxides, alkyl amidopropyl dimethyl amine oxides, alkylamidopropyl-bis(2-hydroxyethyl) amine oxides, betaines, sultaines, alkyl amphoacetates and amphodiacetates, alkyl amphopropionates and amphodipropionates, dodecylbenzene sulfonic acid, and alkyl iminodipropionate. Blends of nonionic and/or amphoteric surfactants, including blends of any of the above recited surfactants, may also be usefully employed in the CIC(s) disclosed herein.

Some examples of suitable anionic surfactants include alkylbenzene sulfonates, alkyldiphenoxyether sulfonates and disulfonates, napthalene sulfonates, linear and branched alkyl sulfonates, fatty alcohol sulfates, fatty alcohol ether sulfates, linear and branched alpha olefin sulfonates. Blends of nonionic and/or amphoteric surfactants with anionic surfactants, including blends of any of the above recited surfactants, are also usefully employed in the CIC.

In some embodiments, the CIC may further comprise at least a residual amount of a weak base, a reaction product thereof, or an analogue thereof. Such a weak base can include one or more amine moieties such as an alkyl amine, or even a non-amine containing weak base configured to salt with or neutralize a residual acid in the CI. Suitable alkyl amines include monoamines (e.g., methyl amine), diamines (e.g., ethylenediamine), triamines (e.g., diethylenetriamine ("DETA")), etc. Such weak bases having one or more amine moieties may be used to quench or stabilize the CI in CICs prior to or contemporaneously with the addition of one or more Log P additives to the CI.

A weak base having one or more amine moieties may quench (e.g., react with to terminate further reactions from) the aldehydes present in a CI or CIC containing the same to reduce or eliminate the cross linking effect of the aldehydes in the CI or CIC containing the same during cold storage.

Accordingly, the non-crosslinked CI will flow at lower temperatures than a cross-linked CI or CIC containing the same.

In some embodiments, the one or more weak bases having one or more amine moieties may be present in the CI, additive composition, or in the CIC in a concentration of less than about 5000 ppm of the CIC, such greater than 0 ppm to about 5,000 ppm, about 5 ppm to about 2,000 ppm, about 50 ppm to about 2,000 ppm, about 100 ppm to about 1,000 ppm, about 300 ppm to about 700 ppm, about 50 ppm to about 500 ppm, about 400 ppm to about 600 ppm, about 500 ppm to about 1,000 ppm, about 500 ppm to about 1,500 ppm, about 700 ppm to about 1,500 ppm, about 800 ppm to about 1,200 ppm, about 1,000 ppm to about 2,000 ppm, about 1,500 ppm to about 2,500 ppm, about 1,000 ppm, about 500 ppm, about 750 ppm, about 250 ppm, about 100 ppm, or greater than about 100 ppm, or less than about 2,000 ppm, less than about 1,000, less than about 500 ppm, or less than about 250 ppm of the CIC.

In some embodiments, a CIC can include 1 wt % to 30 wt % CI about 1 wt % to about 90 wt % Log P additives, and about 1 wt % to about 99 wt % refined petroleum solvent. Each component of a CIC may be present in any of the values or ranges disclosed herein. The CIC can include one or more additives such as surfactants, stabilizers (e.g., DETA), biocides, preservatives, etc. Each of at least some of the one or more additives can be present in the CIC in any of the amounts disclosed herein.

In some embodiments, a CI composition specifically excludes one or more species of any of the additives (or specific species thereof) disclosed herein, such as any of the specific Log P additives (e.g., methanol, or an ether), one or more refined petroleum distillates or solvents (HAN, toluene, etc.), one or more of any of the surfactants disclosed herein, a biocide, a preservative, or a stabilizer. For example, a CIC may exclude Log P additives having hydroxyl moieties; such CICs thus may be said to be characterized by the absence of Log P additives having hydroxyl moieties, or characterized by the absence of Log P additives that are alcohols.

It has also been discovered that some Log P additives and in particular glycol ethers or glycol ether derivatives are useful at enhancing the solubility of the CIs in the CI composition such that they provide effective or even better corrosion inhibition than CI compositions without the Log P additives or glycol ethers or glycol ether derivatives. Enhanced corrosion inhibition can be determined using, for example, the aqueous linear polarization resistance (LPR) kettle (bubble cell) test as described in Example 7. The Log P additives or the glycol ethers or glycol ether derivatives disclosed herein can be used to provide a composition and method that enhances corrosion effectiveness as determined by a reduced corrosion rate.

The amounts of the Log P additives or glycol ethers present in the CI are the same as disclosed herein. Suitable Log P additives that aid in enhancing solubility of the CI comprise, consist essentially of, or consist of anon-polymeric molecule having 1 to 8 carbon atoms such as 6, 5, 4 or fewer carbon atoms, and a Log P between about −1.5 and about 1, such as between about −1.5 and about 0, or −1 and about 0, or about −0.5 and about 0, or about −0.75 and about −0.1, or about −0.6 and about −0.15, or about −0.5 and −0.2, or about −0.3.

In some embodiments, the Log P additives or glycol ethers or glycol ether derivatives suitable for enhancing solubility of CIs includes methanol, isopropyl alcohol, 2-methoxyethanol, ethylene glycol monobutyl ether, propylene carbonate, propyleneglycolmethyletheracetate, propyleneglycoldiacetate, combinations thereof and the like.

In some embodiments, the Log P additives or glycol ethers or glycol ether derivatives suitable for enhancing corrosion inhibition (viz., reducing rate of corrosion) includes methanol, isopropyl alcohol, 2-methoxyethanol, ethylene glycol monobutyl ether, propylene carbonate, propyleneglycolmethyletheracetate, propyleneglycoldiacetate, combinations thereof and the like.

In some embodiments, the Log P additives or glycol ethers or glycol ether derivatives enhance solubility of the CI in the composition compared to a CI without the Log P additive or glycol ether.

In some embodiments, the Log P additives or glycol ether or glycol ether derivatives reduce the rate of corrosion inhibition compared to corrosion inhibitor composition without the Log P additive or glycol ether.

In some embodiments, the CI composition can be provided as a kit. The kit may include the CI as non-aqueous liquid compositions, as aqueous compositions or both. The kit may further include one or more containers configured to store, transport, mix, or dispense the CI compositions; and optionally, instructions for use of the CI composition.

The CI composition can include one, two, three or four different CIs provided in a single formulation and provided as a non-aqueous or aqueous liquid composition. In some embodiments, the kit may include one or more of any of the CI compositions and/or any components thereof (e.g., additive(s)) disclosed herein. For example, the kit may include a CI composition comprising, consisting essentially of, or consisting of one or more solubilized CIs and a Log P additive in liquid (e.g., solution). Other additives (e.g., surfactants, stabilizers, biocides, etc.) may be added to the CI composition before use. In other embodiments, the other additives may already be supplied separately in the kit and can be mixed with the CI or CIC at the time of use.

The kit includes one or more containers configured to hold the liquid compositions at temperatures between about 60° C. and −50° C. The one or more containers maybe configured to store, transport, mix, or dispense the one or more liquid compositions. The one or more containers may comprise, consist essentially of, or consist of a bottle, a drum, a tank, can, or any other container suitable to hold a fluid composition therein. The one or more containers may be constructed of metal (e.g., steel), a polymer (e.g., polypropylene), or any other material suitable to resist corrosion from the fluid composition stored therein.

The kit may include instructions for use of CI composition. The instructions may include directions detailing how to mix, store, transport, dilute, or dispense the composition. For example, the instructions may include directions detailing how much of the composition should be used in a specific water source or crude oil source based upon the extent of corrosion or content in the water source or crude oil source. Such instructions may include a table detailing the relative amount of the composition to be used per unit time, per unit volume of the crude oil source, or water source.

One of skill in the art would understand that the method of making is not limited in any way by the order of ingredients added. The Log P additive can be added to the CI along with the solvent simultaneously to form a composition having a depressed pour or solidification point from 0 C to about −50° C. or any range therebetween and disclosed herein and to be stored in a liquid at the disclosed temperature ranges.

Depending on the well type and well age, the CI composition can be formulated to be aqueous or non-aqueous. CI compositions are useful to form stable and flowable compositions when in storage, transportation such that they are pumpable and pourable when needed.

The CI composition is also used for reducing or preventing corrosion in equipment such as pipes and containers that are used in the field for hydrocarbon recovery. The CI composition can also be useful in other similar applications and with equipment that come in contact with produced water or injectate.

In embodiments, the CI composition can prevent corrosion of the equipment used to store and transport the composition.

One of skill in the art will understand that the method of using is not limited in any way to timing or location of applying the CI composition. The CI composition may be added at one or more points in a process and at one or more locations. For example, the CI composition can be added directly to produced water or as an injectate. The CI composition can be added continuously or intermittently to the equipment or process as required to prevent or to reduce corrosion.

The CI can be present in the CI composition typically at about 0.2 wt % to 30 wt %, for example about 2 wt % to 20 wt %, about 1 wt % to 15 wt %, greater than about 0 wt % to about 5 wt %, or about 1 wt % to about 4 wt %, and is diluted in the field to about 50 ppm to 10,000 ppm CI (or with the CI composition disclosed herein achieved with better, solubilizing of the CI, even as little as 5 ppm to 10,000 ppm). The CI is added into a crude oil source or a water source (e.g. produced water or injectate), often along with one or more other additives to accomplish e.g. biocidal activity, paraffin inhibition and the like.

The CI composition may be applied to prevent corrosion by any suitable method. For example the CI composition may be applied as a solution that is sprayed, dripped, poured or injected, pumped into a desired opening within a system or in the equipment. In some embodiments, the CI composition can be pumped or injected into a system in a continuous fashion or as a high volume flush to a system.

The CI composition is applied to a systems containing a water source or crude oil source to form a treated water source or treated crude oil source. In some embodiments, treated water source or crude oil source can be observed to have reduced corrosion in the system than systems without addition of the CI composition. Reduction or prevention of corrosion can be evaluated by any known method or test.

While each component of an additive composition or CIC may individually be a solid at −50° C., a principal benefit of the additives is their ability to allow the CIC (encompassing a combination of CI, refined petroleum solvent, and additive composition) to be stable and flow at temperatures as low as −50° C. Such stable mixtures and flow properties facilitate pouring or pumping of the CIC from a storage container or vessel into contact with a crude oil source requiring paraffin inhibition. Thus, in embodiments, a method of the invention includes forming a non-aqueous liquid composition (CIC) comprising, consisting essentially of, or consisting of a CI, a refined petroleum distillate or solvent, and one or more additives in an additive composition; storing the non-aqueous liquid composition in an enclosed container at a first temperature between about −50° C. and 60° C.; removing the non-aqueous liquid composition from the container at a second temperature between about −50° C. and 60° C.; and applying the non-aqueous liquid composition to a crude oil (unrefined petroleum) source. In embodiments, the removing and the applying are accomplished using a mechanical pump. In embodiments, the first temperature, the second temperature, or both are between about −50° C. and 0° C., or about −40° C. to −10° C., or about −40° to −20° C., or about −40° C. to −30° C. It will be understood that storing and removing are carried out over a variable range of temperatures, and in particular storage temperatures often vary during the storage period. The duration of storage may also vary from about 1 day to five years, such as about 2 days to 1 year, or about 1 week to 6 months, or about 2 weeks to 4 months, or about 1 to 2 months. Such storage may take place under various temperature conditions. Storage may take place under sustained temperature conditions for various durations. For example, storing may extend through the winter and/or summer season. Accordingly, storage may take place at −50° C. to 0° C. (e.g., −50° C.) for months (e.g., 1 hour to 6 months or 1 week to 5 months) in some regions, or may take place at temperatures of as high as about 60° C. for months (e.g., 1 hour to 7 months or 1 week to 3 months) in some regions. Thus, the first temperature of the method is suitably measured at any point during storage, wherein the temperature during at least some period of storage is within the stated range. In some embodiments the applying is sufficient to contact the crude petroleum source with about 5 ppm or more of the CI, such as at about 5 ppm to 10000 ppm of the CI, about 500 ppm to about 5000 ppm of the CI, about 50 ppm to 1000 ppm of the CI, at about 100 ppm to about 500 ppm of the CI, less than about 5000 ppm of the CI, or less than about 2000 ppm of the CI.

The method of applying the CIC to the crude oil source is not particularly limited. One of skill will appreciate that CIs are conventionally added by using available equipment including e.g., pipes, mixers, pumps, tanks, injection ports, and the like. Aside from the increased concentration of CI in the CIC, addition of the CIC to a crude oil source or water source is accomplished using conventional equipment and the same equipment with which an operator in the field is acquainted; that is, no special steps or other procedures are required to use the CIC. In some embodiments, the CIC is applied to one or more subterranean hydrocarbon recovery (oil well) locations, such as downhole or on the backside using capillary string, gas lift, slip stream or other methods, at the wellhead, or at any other point downstream of the reservoir. As field systems for hydrocarbon recovery are set up differently and depending on the recovery process, and surrounding environment, the point of applying and timing of the applying of the CI differs depending on the operator and the specific field setup. One of skill will understands that the methods of the invention are not limited in any way by the timing or location of the applying.

Some additional non-limiting embodiments are provided below to further exemplify the present disclosure:

1. A corrosion inhibitor composition comprising:
one or more corrosion inhibitors, one or more solvents, and one or more Log P additives, wherein the composition is stable and flows at a temperature between about −50° C. to about 60° C.

2. A composition comprising:
a produced water; and
a corrosion inhibitor composition of claim 1 effective for inhibiting corrosion of a metal surface contacted with produced water;
wherein the total concentration of the corrosion inhibitor composition is about 5 ppm to 5000 ppm by weight.

3. The corrosion inhibitor composition as in any one of the preceding embodiments, wherein the corrosion inhibitor comprises about 1 wt % to 30 wt % of the composition.

4. The corrosion inhibitor composition as in any one of the preceding embodiments, wherein the solvent comprises about 50 wt % to 90 wt % of the composition.

5. The corrosion inhibitor composition as in any one of the preceding embodiments, wherein the Log P additive comprises about 0.2 wt % to 30 wt % of the composition.

6. The corrosion inhibitor composition as in any one of the preceding embodiments, wherein the Log P additive comprises about 1 wt % to 10 wt % of the composition.

7. The corrosion inhibitor composition as in any one of the preceding embodiments, wherein the one or more corrosion inhibitors is about 1 wt % to 30 wt %, the one or more solvents is about 50 wt % to 90 wt %, and the one or more Log P additives is about 0.2 wt % to 30 wt % of the total composition.

8. The corrosion inhibitor composition as in any one of the preceding embodiments, wherein the one or more Log P additives are non-polymeric, have a Log P value between about −2 and about 0, a molecular weight of about 20 to about 200, and overall carbon content of about 8 carbon atoms or less.

9. The corrosion inhibitor composition as in any one of the preceding embodiments, wherein the one or more Log P additives has Log P value between about −1 and about 0.

10. The corrosion inhibitor composition as in any one of the preceding embodiments, wherein the Log P additive comprises a non-polymeric glycol ether.

11. The corrosion inhibitor composition as in any one of the preceding embodiments, wherein the non-polymeric glycol ether compound comprises ethylene glycol methyl ether, ethylene glycol ethyl ether, ethylene glycol propyl ether, ethylene glycol butyl ether, ethylene glycol hexyl ether, diethylene glycol methyl ether, diethylene glycol ethyl ether, diethylene glycol propyl ether, diethylene glycol butyl ether, diethylene glycol hexyl ether, triethylene glycol methyl ether, triethylene glycol ethyl ether, triethylene glycol propyl ether, propylene glycol methyl ether, propylene glycol ethyl ether, propylene glycol propyl ether, propylene glycol butyl ether, dipropylene glycol methyl ether, dipropylene glycol ethyl ether, dipropylene glycol propyl ether, dipropylene glycol butyl ether, tripropylene glycol methyl ether, tripropylene glycol ethyl ether, ethylene glycol phenyl ether, propylene glycol phenyl ether, or a mixture of two or more thereof.

12. The corrosion inhibitor composition as in any one of the preceding embodiments, wherein the non-polymeric glycol ether compound comprises ethylene glycol methyl ether, ethylene glycol butyl ether, ethylene glycol hexyl ether, or a mixture of two or more thereof.

13. The corrosion inhibitor composition as in any one of the preceding embodiments, wherein the corrosion inhibitor comprises one or more imidazoline, ammonium, alkylpyridine, phosphate ester, or thiol groups.

14. The corrosion inhibitor composition in any one of the preceding embodiments, wherein the corrosion inhibitor is mercaptoethanol.

15. The corrosion inhibitor composition as in any one of the preceding embodiments, wherein the one or more Log P additives comprise one or more of methanol, isopropanol, 1, 2-propanediol, 2-methoxyethanol, monoethylene glycol, ethylene glycol monobutyl ether, propylene carbonate, and propyleneglycolmethyletheracetate and propyleneglycoldiacetate and combinations thereof.

16. The corrosion inhibitor composition as in any one of the preceding embodiments, wherein the composition is stable and flows at a temperature between about 0° C. to about −50° C.

17. The corrosion inhibitor composition as in any one of the preceding embodiments, wherein the composition is stable and flows at a temperature between about 0° C. to about 60° C.

18. Use of the composition as in any of the preceding embodiments to reduce or prevent corrosion of corrosion of a metal surface contacted with produced water.

19. Use of the composition as in any of the preceding embodiments to enhance solubility of the one or more corrosion inhibitors in the corrosion inhibitor composition.

20. The use of the composition as in any preceding embodiments to enhance solubility of the CI in the composition compared to a CI without the Log P additive or glycol ether.

21. A method of applying a corrosion inhibitor composition to a water source, the method comprising:

providing a corrosion inhibitor composition, wherein the composition comprises one or more corrosion inhibitors, one or more solvents, and one or more Log P additives, wherein the composition is stable and flows at a temperature between about −50° C. to about 60° C.

storing the corrosion inhibitor composition in an enclosed container at a first temperature between about −50° C. and 60° C.;

removing the corrosion inhibitor composition from the container at a second temperature between about −50° C. and 60° C.; and applying the corrosion inhibitor composition to a water source;

wherein the removing and the applying are accomplished using a mechanical pump.

22. The method of embodiment 21, wherein the first temperature, the second temperature, or both the first and second temperature is between about −40° C. and −20° C.

23. The method of any one of the embodiments 21-22, wherein the providing comprises mixing about 1 wt % to 30 wt % of the corrosion inhibitor, about 50 wt % to 90 wt % of one or more solvent, and about 1 wt % to 30 wt % of the one or more Log P additives.

24. The method of any one of the embodiments of 21-23, wherein the corrosion inhibitor comprises about 1 wt % to 30 wt % of the composition.

25. The method of any one of the embodiments of 21-23, wherein the solvent comprises about 50 wt % to 90 wt % of the composition.

26. The method of any one of the embodiments of 21-25, wherein the Log P additive comprises about 0.2 wt % to 30 wt % of the composition.

27. The method of any one of the embodiments of paragraph 21-25, wherein the Log P additive comprises about 1 wt % to 10 wt % of the composition.

28. The method of any one of the embodiments of 21-27, wherein the one or more Log P additives are non-polymeric, have a Log P value between about −2 and about 0, a molecular weight of about 20 to about 200, and overall carbon content of about 8 carbon atoms or less.

29. The method of any one of the embodiments of 21-28, wherein the one or more Log P additives has Log P value between about −1 and about 0.

30. The method of any one of the embodiments 21-29, wherein the Log P additive comprises a non-polymeric glycol ether.

31. The method of 21-30, wherein the non-polymeric glycol ether compound comprises ethylene glycol methyl ether, ethylene glycol ethyl ether, ethylene glycol propyl ether, ethylene glycol butyl ether, ethylene glycol hexyl ether, diethylene glycol methyl ether, diethylene glycol ethyl ether, diethylene glycol propyl ether, diethylene glycol butyl ether, diethylene glycol hexyl ether, triethylene glycol methyl ether, triethylene glycol ethyl ether, triethylene glycol propyl ether, propylene glycol methyl ether, propylene glycol ethyl ether, propylene glycol propyl ether, propylene glycol butyl ether, dipropylene glycol methyl ether, dipropylene glycol ethyl ether, dipropylene glycol propyl ether, dipropylene glycol butyl ether, tripropylene glycol methyl ether, tripropylene glycol ethyl ether, ethylene glycol phenyl ether, propylene glycol phenyl ether, or a mixture of two or more thereof.

32. The method of any one of the embodiments 21-31, wherein the non-polymeric glycol ether compound comprises ethylene glycol methyl ether, ethylene glycol butyl ether, ethylene glycol hexyl ether, or a mixture of two or more thereof.

33. The method of any one of the embodiments 21-32, wherein the corrosion inhibitor comprises one or more imidazoline, ammonium, alkylpyridine, phosphate ester, or thiol groups.

34. The method of any one of the embodiments 21-33, wherein the corrosion inhibitor is mercaptoethanol.

35. The method of any one of the embodiments 21-34, wherein the one or more Log P additives comprise one or more of methanol, isopropanol, 1, 2-propanediol, 2-methoxyethanol, monoethylene glycol, ethylene glycol monobutyl ether, propylene carbonate, and propyleneglycolmethyletheracetate and propyleneglycoldiacetate and combinations thereof.

EXAMPLES

Example 1

A number of formulations were prepared by mixing a water-soluble corrosion inhibitor with various solvents or solvent combinations as shown in Table 2 below and each formulation introduced into separate glass vials. The amounts of each ingredient shown in Table 2 are as weight percentages of the total composition. Each vial containing the respective formulations was placed in a temperature controlled environment with temperature set to −40° C. The water-soluble corrosion inhibitor is a tall oil fatty acid and imidazoline-based corrosion inhibitor.

The change in the appearance of the initial formulation, which started as a clear liquid, was visually observed after a specified period (e.g. 93 hours). The visual observation for each formulation is shown in Table 2 and FIG. 1. If the initial formulation remained a liquid, it is denoted as L or if the initial formulation solidified after a specified time period, it was denoted as solid (S) or frozen (F). Further details about the appearance of each formulation are shown in Table 2.

If the liquid solidified or froze, it indicated a poor solvent system. If the liquid remained a liquid after the cold period, it indicated a solvent with good low temperature stability and performance for the corrosion inhibitor.

TABLE 2

| Raw Material | 106A | 106B | 106C | 106D | 106E | 106F | 106G | 106H | 106I |
|---|---|---|---|---|---|---|---|---|---|
| CI1 | 16 | 16 | 16 | 16 | 18 | 16 | 16 | 16 | 16 |
| Water | 42 | 42 | 42 | 42 | 42 | 42 | 42 | 42 | 42 |
| Mono ethylene glycol (MEG) | 42 | | | | | | | | |
| Methanol | | 42 | | | | | | | |
| Isopropyl alcohol (IPA) | | | 42 | | | | | | |
| Ethylene glycol monobutyl ether (EGMBE) | | | | 42 | | | | | |
| 2-methoxyethanol | | | | | 42 | | | | |
| Propylene carbonate | | | | | | 42 | | | |
| Propyleneglycolmethyletheracetate (PMA) | | | | | | | 42 | | |
| propyleneglycoldiacetate (PGDA) | | | | | | | | 42 | |
| 50 PMA:50 PGDA) | | | | | | | | | 42 |
| Appearance after 93 h at −40° C. | L, | L, H | L, H | S/F | L, SH | S/F | S/F | S/F | S/F |

S/F: solid/frozen
L: liquid
C: clear
H: hazy
vSH: very slight haze

As shown in Table 2, Example 106A with MEG remained a liquid after 93 hours at −40° C. with a few frozen particles, whereas Example 106D, in which EGMBE is the solvent, solidified and froze.

Example 2

The formulations were prepared by mixing the corrosion inhibitor as in Example 1 with similar solvents or solvent combinations as described in Example 1, but with differing amounts. The specific amounts shown are in Table 3 and each formulation was introduced into a glass vial as described in Example 1. The amounts of each ingredient in each formulation are shown as weight percentages.

TABLE 3

| Raw Material | 106J | 106K | 106L | 106M | 106N | 106O | 106P | 106Q- | 106R2- |
|---|---|---|---|---|---|---|---|---|---|
| CI1 (water) | 16 | 16 | 16 | 16 | 16 | 16 | 16 | 16 | 16 |
| MEG | 84 | | | | | | | | |
| (methanol) | | 84 | | | | | | | |
| Isopropyl alcohol | | | 84 | | | | | | |
| (EGMBE) | | | | 84 | | | | | |
| 2-methoxyethanol | | | | | 84 | 25 | 25 | 25 | 25 |
| Propylene carbonate | | | | | | 59 | | | |
| (propyleneglycolmethyletheracetate) (PMA) | | | | | | | 59 | | |
| (propyleneglycoldiacetate) (PGIJA) | | | | | | | | 59 | |
| (50:50 PMA:PGDA) | | | | | | | | | 59 |
| Appearance after 93 h at −40 GC | S/F | L, C | L, C | L, C | L, C | L, H | L, C | L, vSH | L, C |

S/F: solid/frozen
L: liquid
C: clear
H: hazy
vSH: very slight haze

As Table 3 shows, the varying the amounts of the solvents and solvent blends resulted in depressing the freeze point for a water based corrosion inhibitor at −40° C.

Example 3

The formulations were prepared by mixing the corrosion inhibitor as in Example 1 with similar solvents or solvent combinations as described in Example 1, but with differing amounts. The specific amounts shown are in Table 4 and each formulation was introduced into a glass vial as described in Example 1. The amounts of each ingredient in each formulation are shown as weight percentages.

TABLE 4

| Raw Material | 106J | 106K | 106L | 106M | 106N | 106O-2 | 106P-2 | 106Q-2 | 106R-2 |
|---|---|---|---|---|---|---|---|---|---|
| CI1 | 16 | 16 | 16 | 16 | 16 | 16 | 16 | 16 | 18 |
| water | | | | | | | | | |
| MEG | | | | | | 84 | | | |
| methanol | | 84 | | | | | | | |
| (IPA) | | | 84 | | | | | | |
| (EGMBE) | | | | 84 | | | | | |
| 2-methoxyethanol | | | | | 84 | 25 | 25 | 25 | 25 |
| Propylene carbonate | | | | | | 59 | | | |
| R-54025 (propyleneglycolmethyletheracetate)(PMA)- | | | | | | | 59 | | |
| R-54028 (propyleneglycoldiacetate) (PGDA) | | | | | | | | 59 | |
| 50:50 R-54025:R-54026 (50:50 PMA:PGDA) | | | | | | | | | 59 |
| Appearance after blending at RIP (−22° C.) | CBL | CBL | CBL | CBL | CBL | CBL | CBL | CBL | CBL |
| Appearance after 141 h at −40° C. | S/F | CBL | CBL | CBL | CBL | L, H | CBL | L, vSH | CBL |
| Appearance after h at −20° C. | | | | | | | | | |

S/F: solid/frozen
L: liquid
C: clear
H: hazy
vSH: very slight haze
CBL: clear bright liquid

Example 4

The formulations were prepared by mixing the corrosion inhibitor as in Example 1 with similar solvents or solvent combinations as described in Example 1, but with differing amounts. The specific amounts shown are in Table 5 and each formulation was introduced into a glass vial as described in Example 1. The amounts of each ingredient in each formulation are shown as weight percentages.

TABLE 5

| Raw Material | 106S | 106T | 106U | 106V |
|---|---|---|---|---|
| CI 1 | 16 | 16 | 16 | 16 |
| (water) | 69 | | | 15 |
| (MEG) | | 14 | 10 | 10 |
| (methanol) | | | | |
| (IPA) | | | | |
| (EGMBE) | | | | |
| 2-methoxyethanol | | | | |
| Propylene carbonate | | 55 | | |
| R-54025 (propyleneglycolmethyletheracetate) (PMA) | | | 59 | 44 |
| R-54026 (propyleneglycoldiacetate) (PGDA) | | | | |
| 50:50 R-54025:R-54026 (50:50 PMA:PGDA) | | | | |

TABLE 5-continued

| Raw Material | 106S | 106T | 106U | 106V |
|---|---|---|---|---|
| PR-9012 (C13 alcohol with random mix EO PO) | 15 | 15 | 15 | 15 |
| Appearance after blending at RTP (-22° C.) | CBL | CBL | CBL | CBL |
| Appearance after 141 h at -40° C. | S/F | L, 2L | L, CG | L, 2L |
| Appearance after h at -20° C. | | | | |

S/F: solid/frozen
L: liquid
C: clear
H: hazy
vSH: very slight haze

Example 5

The formulations were prepared as in Example 1 with similar solvents or solvent combinations as described in Example 1, but with differing amounts and a different corrosion inhibitor. The specific amounts shown are in Table 6 and each formulation was introduced into a glass vial as described in Example 1. The amounts of each ingredient in each formulation are shown as weight percentages. The corrosion inhibitor used is a quaternary ammonium chloride-based corrosion inhibitor.

TABLE 6

| Raw Material | 108B | 108C | 108D | 108E | 108F | 108G | 108H | 108I | 108J |
|---|---|---|---|---|---|---|---|---|---|
| CI 2 | 100 | 68.5 | 68.5 | 68.5 | 68.5 | 68.5 | 68.5 | 68.5 | 68.5 |
| methanol | | 31.5 | | | | | | | |
| IPA | | | 31.5 | | | | | | |
| EGMB | | | | 31.5 | | | | | |
| 2-methoxyethanol | | | | | 31.5 | | | | |
| Propylene carbonate | | | | | | 31.5 | | | |
| R-54025 (propyleneglycolmethyletheracetate) (PMA) | | | | | | | 31.5 | | |
| R-54028 (propyleneglycoldiacetate) (PGDA) | | | | | | | | 31.5 | |
| 50:50 R-54025:R-54026 (50:50 PMA:PGDA) | | | | | | | | | 31.5 |
| R-99 (water) | | | | | | | | | |
| R-711 (MEG) | | | | | | | | | |
| PR-9012 (C13 alcohol with random mix EO PO) | | | | | | | | | |
| Appearance after blending at RIP (-.22° C.) | CBL | CBL | CBL | CBL | CBL | CBL | CBL | CBL | CBL |
| Appearance after 90 h at -40° C. | S/F* | CBL | CBL | CBL | CBL | S/F* | CBL | Si' | S/F* |
| Appearance after h at -20° C. | | | | | | | | | |

S/F: solid/frozen
L: liquid
C: clear
H: hazy
vSH: very slight haze

Example 6

The formulations were prepared as in Example 1 with similar solvents or solvent combinations as described in Example 1, but with differing amounts and a different corrosion inhibitor. The specific amounts shown are in Table 7 and each formulation was introduced into a glass vial as described in Example 1. The amounts of each ingredient in each formulation are shown as weight percentages. The corrosion inhibitor used is a quaternary ammonium chloride-based corrosion inhibitor.

TABLE 7

| Raw Material | 108K | 108L | 108M | 108N | 108O | 108P | 108Q |
|---|---|---|---|---|---|---|---|
| CI2 | 68.5 | 68.5 | 68.5 | 68.5 | 68.5 | 68.5 | 68.5 |
| methanol | | | | | | | |
| IPA | | | | | | | |
| EGMBE | | | | | | | |
| 2-methoxyethanol | | 8.5 | | | | | |
| Propylene carbonate | 5 | | 21.5 | | | | 15.75 |
| propyleneglycolmethyletheracetate (PMA) | | | | 21.5 | | | |
| propyleneglycoldiacetate (PGDA) | | | | | | | |
| 50 PMA:50PGDA | | | | | | | |
| water | 21.5 | 13 | | | | | |
| MEG | 5 | | | | 31.5 | 21.5 | 15.75 |
| PR-9012 (C13 alcohol with random mix EO PO) | | 10 | 10 | 10 | | 10 | |
| Appearance after blending at RTP (-22° C.) | CBL | CBL | CBL | CBL | vSH | CBL | CBL |
| Appearance after 90 h at -40° C. | S/F* | S/F* | CBL | CBL | CBL | S/F* | CBL |

Example 7

To investigate the efficiency of corrosion inhibition, the corrosion rate of a steel electrode as measured by aqueous linear polarization resistance (LPR) kettler (bubble cell) test was used. The steel electrodes (C1018) were placed in a bath of oil field brine through which carbon dioxide was slowly bubbled. The corrosion rate of the electrode is compared in the absence or presence of a corrosion inhibitor.

The water includes about 3 wt % of the sodium chloride and synthetic oil (LVT-200 and xylene). The ratio of water to oil was 80:20. The water was placed into kettles and purged with $CO_2$. The water was continually purged with $CO_2$ to saturate the water prior to starting the test. After the test began the test cell was blanketed with $CO_2$ through the duration of the test to maintain saturation. The kettles were stirred at 100 revolutions per minute (rpm) for the duration of the test to maintain thermal equilibrium at 80° C. The electrodes were all cleaned and polished prior to testing. The kettles were dosed with Samples A-D and a blank (i.e. the brine and synthetic oil without a corrosion inhibitor).

Additional details of preparing the corrosion inhibitor samples are shown in the tables below.

TABLE 8

Test Conditions

| | |
|---|---|
| Temperature (° C.) | 80 |
| Water Cut (%) | 80 |
| Oil Type | 75% LVT-200, 25% Xylene |
| Stirrer Speed (rpm) | 100 |
| Purge Gas | CO2 |
| $CO_2$ pressure | Ambient |
| $H_2S$ (ppm) | 0 |
| Electrode Material | C1018 |

To demonstrate the additional performance enhancement solely from the solvent addition, the non-solvent part of the corrosion inhibitor, which was quaternary ammonium compound and phosphate ester based, was kept constant with the same activity in each case. The non-solvent part contained 53.5% of the formulation. There was also the same amount of water (15%) in each blend. The remaining 31.5% of the formulation differed in the non-water solvent. CIA and CIB included commonly used solvents of 31.5% methanol and 31.5% IPA, respectively, while CIC and CID included novel solvents, 31.5% Propyleneglycoldiacetate (PGDA) and 31.5% Propylene carbonate, respectively. This is summarized in the table below.

TABLE 9

| Description | CI A Weight % | CI B Weight % | CI C Weight % | CI D Weight % |
|---|---|---|---|---|
| Non-solvent components | 53.5 | 53.5 | 53.5 | 53.5 |
| Water | 15.0 | 15.0 | 15.0 | 15.0 |
| Methanol | 31.5 | 0 | 0 | 0 |
| IPA | 0 | 31.5 | 0 | 0 |
| Propyleneglycoldiacetate (PGDA) | 0 | 31.5 | 31.5 | 0 |
| Propylene carbonate | 0 | 0 | 0 | 31.5 |

Figure 1:
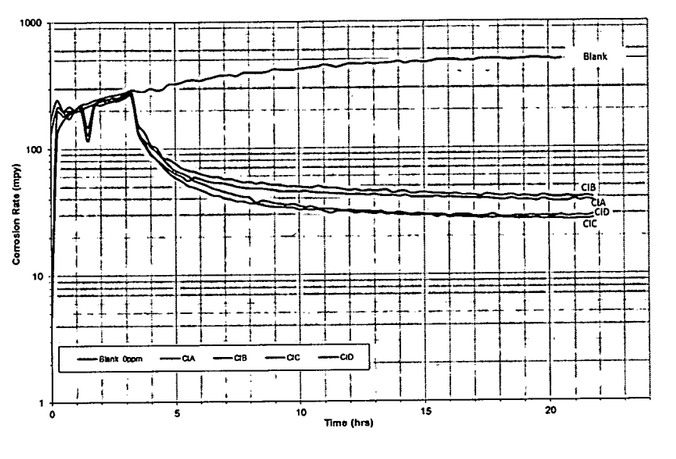
FIG. 1 is a plot showing rate of corrosion as a function of time for various corrosion inhibitors.

The results of the bubble test are shown in FIG. 1. FIG. 1 shows rate of corrosion three hours after the CI is injected into the test. The three four CI samples A-D show a reduced corrosion rate compared to the blank that does not include any CI. Sample C and D show reduced corrosion compared to sample A and B. In other words, improved corrosion inhibition rates were observed when propyleneglycoldiacetate (PGDA) and propylene carbonate (CIC and CID, respectively) were used compared to commonly used methanol and IPA.

The invention illustratively disclosed herein can be suitably practiced in the absence of any element which is not specifically disclosed herein. Additionally each and every embodiment of the invention, as described herein, is intended to be used either alone or in combination with any other embodiment described herein as well as modifications, equivalents, and alternatives thereof. In various embodiments, the invention suitably comprises, consists essentially of, or consists of the elements described herein and claimed according to the claims. It will be recognized that various modifications and changes may be made without following the example embodiments and applications illustrated and described herein, and without departing from the scope of the claims.

We claim:

1. A corrosion inhibitor composition comprising:
corrosion inhibitors, solvents, and Log P additives comprising 2-methoxyethanol, propylene carbonate, propyleneglycolmethyletheracetate, propyleneglycoldiacetate and combinations thereof, wherein the composition is stable and flows at a temperature between about −50° C. to about 60° C.

2. A composition comprising:
a produced water; and
a corrosion inhibitor composition of claim 1 effective for inhibiting corrosion of a metal surface contacted with produced water;
wherein the total concentration of the corrosion inhibitor composition is about 5 ppm to 5000 ppm by weight.

3. The corrosion inhibitor composition of claim 1, wherein the corrosion inhibitor comprises about 1 wt % to 30 wt % of the composition.

4. The corrosion inhibitor composition of claim 1, wherein the solvent comprises about 50 wt % to 90 wt % of the composition.

5. The corrosion inhibitor composition of claim 1, wherein the Log P additive comprises about 0.2 wt % to 30 wt % of the composition.

6. The corrosion inhibitor composition as in of claim 1, wherein the corrosion inhibitors is about 1 wt % to 30 wt %, the solvents is about 50 wt % to 90 wt %, and the Log P additives is about 0.2 wt % to 30 wt % of the total composition.

7. The corrosion inhibitor composition of claim 1, wherein the Log P additives has Log P value between about −1 and about 0.

8. The corrosion inhibitor composition of claim 1, wherein the Log P additive further comprises ethylene glycol methyl ether, ethylene glycol butyl ether, ethylene glycol hexyl ether, or a mixture of two or more thereof.

9. The corrosion inhibitor composition of claim 1, wherein the corrosion inhibitor is mercaptoethanol.

* * * * *